(12) United States Patent
Sakai et al.

(10) Patent No.: US 10,578,209 B2
(45) Date of Patent: Mar. 3, 2020

(54) VEHICLE CONTROL APPARATUS

(71) Applicant: TOYOTA JIDOSHA KABUSHIKI KAISHA, Toyota-shi, Aichi-ken (JP)

(72) Inventors: Takaaki Sakai, Nisshin (JP); Kohei Dodo, Nisshin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 92 days.

(21) Appl. No.: 15/883,546

(22) Filed: Jan. 30, 2018

(65) Prior Publication Data

US 2018/0216727 A1    Aug. 2, 2018

(30) Foreign Application Priority Data

Feb. 1, 2017  (JP) .................................. 2017-017159

(51) Int. Cl.
| | | |
|---|---|---|
| *F16H 61/02* | (2006.01) | |
| *F16H 59/60* | (2006.01) | |
| *F16H 59/18* | (2006.01) | |

(52) U.S. Cl.
CPC ......... *F16H 61/0213* (2013.01); *F16H 59/18* (2013.01); *F16H 59/60* (2013.01); *F16H 2061/0227* (2013.01)

(58) Field of Classification Search
None
See application file for complete search history.

(56) References Cited

U.S. PATENT DOCUMENTS

| | | | |
|---|---|---|---|
| 6,015,020 A * | 1/2000 | Sugiyama | ............ B60K 28/165 180/197 |
| 6,070,118 A | 5/2000 | Ohta et al. | |
| 10,208,854 B2 * | 2/2019 | Mullen | ............... F16H 61/0213 |
| 2015/0345622 A1 * | 12/2015 | Sujan | ................... F16H 61/0213 701/55 |

FOREIGN PATENT DOCUMENTS

| | | |
|---|---|---|
| CN | 1162083 A | 10/1997 |
| JP | H09303544 A | 11/1997 |
| JP | 11-315734 A | 11/1999 |
| JP | 2008232391 A | 10/2008 |
| JP | 2013154668 A | 8/2013 |

* cited by examiner

*Primary Examiner* — Justin Holmes
(74) *Attorney, Agent, or Firm* — Hunton Andrews Kurth LLP

(57) ABSTRACT

A vehicle control apparatus is configured to execute gear shifting in an automatic transmission, in accordance with at least one selected shifting line, which is selected from among at least one first shifting line and at least one second shifting line, depending on (i) acceleration representative information related to an acceleration representative value representing an acceleration of the vehicle required by an operator of the vehicle and (ii) location information related to a current location of the vehicle, wherein each of the at least one first shifting line is a shifting line stored in a storage device provided in the vehicle, and each of the at least one second shifting line is a shifting line in which other-vehicle-related information is reflected. The other-vehicle-related information is information received from an external device located outside the vehicle, and related to other vehicle that is at least one vehicle other than the vehicle.

8 Claims, 7 Drawing Sheets

VEHICLE CONTROL APPARATUS

This application claims priority from Japanese Patent Application No. 2017-017159 filed on Feb. 1, 2017, the disclosure of which is herein incorporated by reference in its entirety.

FIELD OF THE INVENTION

The present invention relates to a vehicle control apparatus that executes gear shifting in an automatic transmission by using information received from an external device.

BACKGROUND OF THE INVENTION

There is well known a vehicle control apparatus that executes gear shifting in an automatic transmission by using information received from an external device. A vehicle control apparatus disclosed in JP-H11-315734A is an example of this type of control apparatus. This document discloses that a vehicle running environment is assumed based on the information received from the external device and then a shifting characteristic suitable for the running environment is set, so that the gear shifting is executed in accordance with the shifting characteristic in the automatic transmission.

SUMMARY OF THE INVENTION

It might be possible to receive, from the external device, information related to a shifting line that varies depending on area, namely, depending on which one of various types of roads (or information based on which a shifting line is to be set), and then switch the shifting line that is used to execute the gear shifting in the automatic transmission, depending on the type of road. However, there is possibility that the gear shifting with use of such a shifting line that varies depending on area does not correspond to gear shifting in conformity with an intention of the vehicle operator.

The present invention was made in view of the background art described above. It is therefore an object of the present invention to provide a control apparatus for a vehicle, which is capable of executing gear shifting in an automatic transmission, in conformity with the type of road and the intention of an operator of the vehicle.

The object indicated above is achieved according to the following modes of the present invention:

According to a first mode of the invention, there is provided a control apparatus for a vehicle provided with an automatic transmission. The control apparatus is configured to execute gear shifting in the automatic transmission, in accordance with at least one selected shifting line, which is selected from among at least one first shifting line and at least one second shifting line, depending on (i) acceleration representative information related to an acceleration representative value representing an acceleration of the vehicle required by an operator of the vehicle and (ii) location information related to a current location of the vehicle. Each of the at least one first shifting line is a shifting line stored in a storage device provided in the vehicle. Each of the at least second shifting line is a shifting line in which other-vehicle-related information is reflected. The other-vehicle-related information is information received from an external device and related to other vehicle that is at least one vehicle other than the vehicle. It is noted that the control apparatus may generate control information including (a) the location information indicative of an area and (b) the acceleration representative information related to the acceleration representative value representing the acceleration of the vehicle required by the operator of the vehicle in the area, such that the acceleration representative information is associated with the location information indicative of the area, and the control apparatus transfers the generated information to the external device, via a transceiver provided in the vehicle.

According to a second mode of the invention, in the control apparatus according to the first mode of the invention, the at least one second shifting line includes (a) at least one fuel-efficiency-performance-directed second shifting line that is used when more importance is given to a fuel efficiency performance of the vehicle than to a drive force performance of the vehicle and (b) at least one drive-force-performance-directed second shifting line that is used when more importance is given to the drive force performance than to the fuel efficiency performance. The control apparatus is configured, during running of the vehicle with the at least one fuel-efficiency-performance-directed second shifting line being selected as the at least one selected shifting line, to switch the at least one selected shifting line from the at least one fuel-efficiency-performance-directed second shifting line to the at least one drive-force-performance-directed second shifting line, when a change of the acceleration representative value is large and the current location of the vehicle is in at least one predetermined area in which a volume of the other-vehicle-related information is large. The control apparatus is configured, during running of the vehicle with the at least one fuel-efficiency-performance-directed second shifting line being selected as the at least one selected shifting line, to switch the at least one selected shifting line from the at least one fuel-efficiency-performance-directed second shifting line to the at least one first shifting line, when the change of the acceleration representative value is larger than the threshold value and the current location of the vehicle is in at least one predetermined area in which the volume of the other-vehicle-related information is small.

According to a third mode of the invention, the control apparatus according to the second mode of the invention is configured, during running of the vehicle with the at least one fuel-efficiency-performance-directed second shifting line being selected as the at least one selected shifting line, to keep the at least one fuel-efficiency-performance-directed second shifting line as the at least one selected shifting line, when the change of the acceleration representative value is small.

According to a fourth mode of the invention, in the control apparatus according to the second or third mode of the invention, the change of the acceleration representative value is determined to be large, when an amount of the change of the acceleration representative value has exceeded a first threshold value and the amount of the change of the acceleration representative value has exceeded a second threshold value smaller than the first threshold value at least a given number of times within a most recent period having a given length of time.

According to a fifth mode of the invention, in the control apparatus according to the first mode of the invention, the at least one first shifting line includes (a) at least one fuel-efficiency-performance-directed first shifting line that is used when more importance is given to a fuel efficiency performance of the vehicle than to a drive force performance of the vehicle and (b) at least one drive-force-performance-directed first shifting line that is used when more importance is given to the drive force performance than to the fuel efficiency performance, and the at least one second shifting line includes (c) at least one fuel-efficiency-performance-directed second shifting line that is used when more importance is given to the fuel efficiency performance than to the drive force performance and (d) at least one drive-force-performance-directed second shifting line that is used when more importance is given to the drive force performance than to the fuel efficiency performance. The control apparatus is configured, during running of the vehicle with the at least one drive-force-performance-directed first shifting line being selected as the at least one selected shifting line, to switch the at least one selected shifting line from the at least one drive-force-performance-directed first shifting line to the at least one fuel-efficiency-performance-directed second shifting line, when a frequency of the acceleration required by the operator is small and the current location of the vehicle is in at least one predetermined area in which a volume of the other-vehicle-related information is large. The control apparatus is configured, during running of the vehicle with the at least one drive-force-performance-directed first shifting line being selected as the at least one selected shifting line, to switch the at least one selected shifting line from the at least one drive-force-performance-directed first shifting line to the at least one drive-force-performance-directed second shifting line, when the frequency of the acceleration required by the operator is small and the current location of the vehicle is in at least one predetermined area in which the volume of the other-vehicle-related information is small.

According to a sixth mode of the invention, the control apparatus according to the fifth mode of the invention is configured, during running of the vehicle with the at least one drive-force-performance-directed first shifting line being selected as the at least one selected shifting line, to keep the at least one drive-force-performance-directed first shifting line as the at least one selected shifting line, when the frequency of the acceleration required by the operator is large or when the current location of the vehicle is in at least one predetermined area in which more importance is given to the drive force performance than to the fuel efficiency performance.

According to a seventh mode of the invention, in the control apparatus according to the fifth or sixth mode of the invention, the frequency of the acceleration required by the operator is determined to be large, when the vehicle has been accelerated with the acceleration representative value being larger than a given threshold value, at least a given number of times within a most recent period having a given length of time.

According to any one of the first through seventh modes of the invention, the gear shifting is executed in the automatic transmission, in accordance with at least one selected shifting line, which is selected appropriately depending on (i) the acceleration representative information related to the acceleration representative value and reflecting an intention of the vehicle operator and a degree of satisfaction of the vehicle operator and (ii) the location information related to the current location of the vehicle and reflecting a volume of the other-vehicle-related information and a driving operation tendency, which vary area to area. The at least one selected shifting line is selected appropriately from among the at least one first shifting line in which the other-vehicle-related information is not reflected but which is adapted to the vehicle (for example, in which the required acceleration in the vehicle is reflected) and the at least one second shifting line in which the unique difference in each area is reflected by reflection of the other-vehicle-related information. Thus, the gear shifting in the automatic transmission can be executed in conformity with the type of road and the intention of the vehicle operator.

According to any one of the second through fourth modes of the invention, during running of the vehicle with the at least one fuel-efficiency-performance-directed second shifting line being selected as the at least one selected shifting line, the at least one selected shifting line is switched to the at least one drive-force-performance-directed second shifting line, when the change of the acceleration representative value is large and the current location of the vehicle is in the at least one predetermined area in which the volume of the other-vehicle-related information is large, so that it is possible to execute the gear shifting in a manner enabling the acceleration required by the vehicle operator and suitable for the area in which the vehicle currently runs. On the other hand, during running of the vehicle with the at least one fuel-efficiency-performance-directed second shifting line being selected as the at least one selected shifting line, the at least one selected shifting line is switched to the at least one first shifting line, when the change of the acceleration representative value is large and the current location of the vehicle is in the at least one predetermined area in which the volume of the other-vehicle-related information is small. Thus, it is possible to execute the gear shifting in a manner enabling the acceleration required by the vehicle operator, which varies depending on the area in which the vehicle runs.

According to the third mode of the invention, during running of the vehicle with the at least one fuel-efficiency-performance-directed second shifting line being selected as the at least one selected shifting line, the at least one fuel-efficiency-performance-directed second shifting line is kept as the at least one selected shifting line, when the change of the acceleration representative value is small. Thus, it is possible to execute the gear shifting in a manner suitable for the area in which the vehicle currently runs and providing the fuel efficiency performance.

According to the fourth mode of the invention, the change of the acceleration representative value is determined to be large, when the amount of the change of the acceleration representative value has exceeded the first threshold value and the amount of the change of the acceleration representative value has exceeded the second threshold value smaller than the first threshold value at least the given number of times within the most recent period having the given length of time. Thus, it is possible to appropriately determine the intention of the vehicle operator and the degree of satisfaction of the vehicle operator.

According to any one of the fifth through seventh modes of the invention, during running of the vehicle with the at least one drive-force-performance-directed first shifting line being selected as the at least one selected shifting line, the at least one selected shifting line is switched to the at least one fuel-efficiency-performance-directed second shifting line, when the frequency of the acceleration required by the operator is small and the current location of the vehicle is in the at least one predetermined area in which the volume of the other-vehicle-related information is large, so that it is possible to execute the gear shifting in a manner suitable for the area in which the vehicle currently runs and also providing the fuel efficiency performance. On the other hand, during running of the vehicle with the at least one drive-force-performance-directed first shifting line being selected as the at least one selected shifting line, the at least one selected shifting line is switched to the at least one drive-force-performance-directed second shifting line, when the frequency of the acceleration required by the operator is small and the current location of the vehicle is in at least one predetermined area in which the volume of the other-vehicle-related information is small, so that it is possible to execute the gear shifting in a manner enabling the acceleration required by the vehicle operator and suitable for the area in which the vehicle currently runs.

According to the sixth mode of the invention, during running of the vehicle with the at least one drive-force-performance-directed first shifting line being selected as the at least one selected shifting line, the at least one drive-force-performance-directed first shifting line is kept as the at least one selected shifting line, when the frequency of the acceleration required by the operator is large or when the current location of the vehicle is in the at least one predetermined area in which more importance is given to the drive force performance than to the fuel efficiency performance, so that it is possible to execute the gear shifting in a manner enabling the acceleration that is required by the vehicle operator in conformity with the area in which the vehicle currently runs.

According to the seventh mode of the invention, the frequency of the acceleration required by the operator is determined to be large, when the vehicle has been accelerated with the acceleration representative value being larger than the given threshold value, at least the given number of times within the most recent period having the given length of time. Thus, it is possible to appropriately determine the intention of the vehicle operator and the degree of satisfaction of the vehicle operator.

DETAILED DESCRIPTION OF PREFERRED EMBODIMENTS

In embodiments of the present invention, the automatic transmission transmits a drive force from the drive power source to drive wheels. The automatic transmission may be, for example, a known planetary gear automatic transmission, a known synchronous meshing type parallel two-shaft automatic transmission, a so-called DCT (Dual Clutch Transmission) which is a synchronous meshing type parallel two-shaft automatic transmission and which is of a type having two systems of input shafts, a so-called belt type continuously variable transmission, a so-called toroidal type continuously variable transmission or an electric continuously variable transmission. Among these transmissions, for example, the planetary gear automatic transmission may include a hydraulic transmission device.

In embodiments of the present invention, the drive power source may be an internal combustion engine such as a gasoline engine and a diesel engine generating the drive force by combustion of fuel supplied thereto. The vehicle may be equipped with, in addition to or in place of the engine, another drive power source in the form of, for example, an electric motor.

The embodiments will be described in detail with reference to the drawings.

First Embodiment

Figure 1:
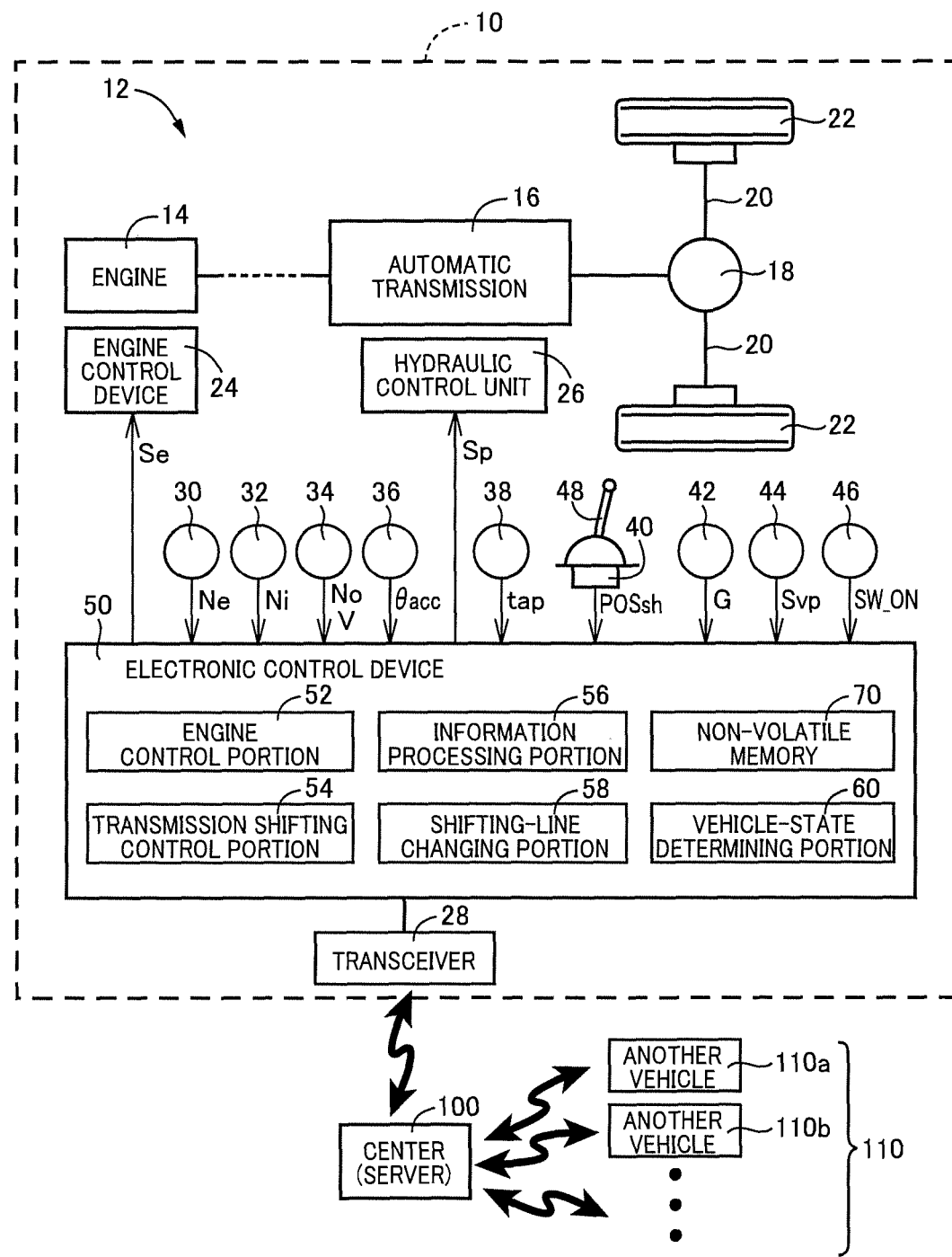
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the drive system 12 is provided with an engine 14 functioning as a drive power source, an automatic transmission 16 connected directly or indirectly via a damper (not shown) or any other device to the engine 14, a differential gear device 18 connected to an output rotary member of the automatic transmission 16 and a pair of axles 20 connected to the differential gear device 18. In the drive system 12, a drive force ("drive torque" or "drive power" unless otherwise distinguished from the drive force) of the engine 14 is transmitted to the automatic transmission 16, and is transmitted from the automatic transmission 16 to drive wheels 22 of the vehicle 10 through the differential gear device 18 and other devices.

The engine 14 is provided with an engine control device 24 including an electronic throttle device, a fuel injection device, an ignition device and other devices that are required for controlling an output of the engine 14. In the engine 14, the engine control device 24 is controlled, by an electronic control device 50 (that will be described below), based on an operation amount θacc of an accelerator pedal that corresponds to a required drive force of the vehicle 10 required by an operator of the vehicle 10, whereby an engine torque Te of the engine 14 is controlled. Thus, a throttle opening degree tap, i.e., a degree of opening of a throttle valve included in the electronic throttle device, is also a value corresponding to the required drive force.

The automatic transmission 16 is a step-variable transmission that constitutes a part of a power transmitting path between the engine 14 and the drive wheels 22. The automatic transmission 16 is a known planetary gear automatic transmission including, for example, a plurality of planetary gear devices and a plurality of hydraulically operated frictional coupling devices (hereinafter referred to as "coupling devices CB") such as clutches and brakes. The coupling devices CB are selectively placed in engaged, slipped or released states, with their torque capacities being changed according to engaging hydraulic pressures applied thereto, which are regulated by respective solenoid-operated valves or the like incorporated within a hydraulic control unit (hydraulic control circuit) 26. In the automatic transmission 16 having a plurality of gear positions (speed positions) having respective different speed ratios (gear ratios) e (=AT input speed Ni/AT output speed No), a selected one of a plurality of gear positions is established by engagement of one or ones of the coupling devices CB. That is, an operation state of each of the coupling devices CB is controlled, depending on, for example, an operation (acceleration operation) of the accelerator pedal by the vehicle operator and a running speed V of the vehicle, by the electronic control device 50, whereby one of the gear positions is switched to another of the gear positions (namely, the plurality of gear positions are selectively established). Further, in the automatic transmission 16, with all of the coupling devices CB being placed in their released states, a neutral state is established without any one of the gear positions being established, so that the transmission of the drive force through the automatic transmission 16 is cut off. A clutch C 1 is one of the coupling devices CB, and functions as an input clutch of the automatic transmission 16. The clutch C 1 is disposed in a power transmitting path between the engine 14 and the drive wheels 22, so as to function also as a connecting/disconnecting device configured to selectively connect and disconnect the power transmitting path (namely, selectively allowing and inhibiting transmission of the drive force through the power transmitting path). Thus, the automatic transmission 16 is placed in the neutral state with the clutch C 1 being placed in its released state. It is noted that the automatic transmission 16 may be constituted by a belt type or other type continuously variable transmission in place of the step-variable transmission.

The vehicle 10 is provided with a transceiver 28. The transceiver 28 is a device configured to communicate with a site or center 100 that is a facility existing apart from the vehicle 10, so that the electronic control device 50 provided in the vehicle 10 transmits and receives various informations to and from the center 100 via the transceiver 28. The center 100 functions as a server, and is configured to receive, process, store and provide various informations. The center 100 transmits and receives various informations to and from other vehicles 110a, 110b, (hereinafter referred to as "other vehicles 110"), as well as to and from the vehicle 10. Each of the other vehicles 110 has substantially the same construction as the vehicle 10 and basically has substantially the same functions as the vehicle 10. The center 100 and the other vehicles 110 can be considered as external devices that are located outside the vehicle 10. It can be considered that the electronic control device 50 of the vehicle 10 cooperates with the center 100 and electronic control devices (each of which functionally corresponds to the electronic control device 50) of the other vehicles 110 to constitute a vehicle control system in which the various informations are shared with one another.

The vehicle 10 is provided with the electronic control device 50 as a controller including the control apparatus constructed according to the present invention. The electronic control device 50 is configured to control various devices of the vehicle 10 such as the engine 14 and automatic transmission 16. For example, the electronic control device 50 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 50 may be constituted by two or more control units exclusively assigned to perform different control operations such as engine control operations and transmission shifting control operations.

The electronic control device 50 receives various input signals based on values detected by respective sensors provided in the vehicle 10. Specifically, the electronic control device 50 receives: an output signal of an engine speed sensor 30 indicative of an engine speed Ne which is a rotation speed of the engine 14; an output signal of an input speed sensor 32 indicative of a transmission input speed Ni which is an input rotation speed of the automatic transmission 16; an output signal of an output speed sensor 34 indicative of a transmission output speed No which is an output rotation speed of the automatic transmission 16 and which corresponds to a running speed V of the vehicle 10; an output signal of an accelerator operation amount sensor 36 indicative of an operation amount θacc which represents a degree of acceleration of the vehicle 10 required by a vehicle operator; an output signal of a throttle opening degree sensor 38 indicative of the throttle opening degree tap; an output signal of a shift position sensor 40 indicative of an operation position POSsh of a manually operated shifting member in the form of a shift lever 48 provided in the vehicle 10; an output signal of an acceleration sensor 42 indicative of an acceleration G of the vehicle 10; an output signal of a location sensor 44 including a GPS antenna and indicative of information Svp (hereinafter referred to as "location information Svp") related to a position or location of the vehicle 10 on earth's surface or map, which is represented by a GPS signal or the like; and an output signal of a drive-mode selector switch 46 indicative of a mode-on SW_ON which represents operation of the drive-mode selector switch 46. Further, the electronic control device 50 generates various output signals which are supplied to various devices such as the engine control device 24 and the hydraulic control unit 26 and which include an engine control command signal Se for controlling the engine 14; and hydraulic control command signals Sp for controlling the operation states of the coupling devices CB. The hydraulic control command signals Sp are command signals (drive currents) to be supplied to the hydraulic control unit 26 for driving solenoid-operated valves or the like that regulate engaging hydraulic pressures PRcb to be applied to hydraulic actuators of the coupling devices CB. The electronic control device 50 sets hydraulic pressure command values (command pressures) corresponding to the engaging hydraulic pressures PRcb to be applied to the hydraulic actuators, and outputs drive currents corresponding to the hydraulic pressure command values.

The drive-mode selector switch 46 is an operating member that is to be operated by the vehicle operator, for selecting a desired one of drive modes with which the vehicle is to run. The drive modes consist of, for example, a normal mode (or ordinary running mode), a sport mode (or power mode) and an economy mode. The normal mode is for enabling the vehicle 10 to run in a state in which the fuel efficiency performance is being exhibited satisfactorily with also the drive force performance being exhibited. The sport mode is for enabling the vehicle 10 to run in a state in which more importance is given to the drive force performance than to the fuel efficiency performance, as compared with the state of the normal mode. The economy mode is for enabling the vehicle 10 to run in a state in which more importance is given to the fuel efficiency performance than to the drive force performance, as compared with the state of the normal mode.

The electronic control device 50 includes an engine control means or portion in the form of an engine control portion 52 and a transmission shifting control means or portion in the form of a transmission shifting control portion 54, for performing various controls in the vehicle 10.

The engine control portion 52 controls the engine control device 24, so as to obtain a required engine torque Te. The engine control portion 52 calculates a required drive torque Tdem as a required drive force, for example, by applying the accelerator operation amount θacc and the running velocity V to a predetermined or stored relationship (e.g., drive force map) that is obtained by experimentation or determined by an appropriate design theory. The engine control portion 52 takes account of the gear position of the automatic transmission 16, and outputs the engine control command signal Se for controlling the engine 14 such that the engine torque Te providing the required drive torque Tdem is obtained. As the above-described required drive force, a required drive force Fdem [N] acting on the drive wheels 22, a required drive power Pdem [W] acting on the drive wheels 22, a required output torque Todem outputted from the automatic transmission 16, a required input torque Tidem inputted to the automatic transmission 16, or a required engine torque Tedem outputted from the engine 14 may be used in place of the required drive torque Tdem [Nm] acting on the drive wheels 22. Further, simply, the accelerator operation amount θacc [%], the throttle opening degree tap [%] or an amount [g/sec] of air intake by the engine 14 may be used as the above-described required drive force.

Figure 5:
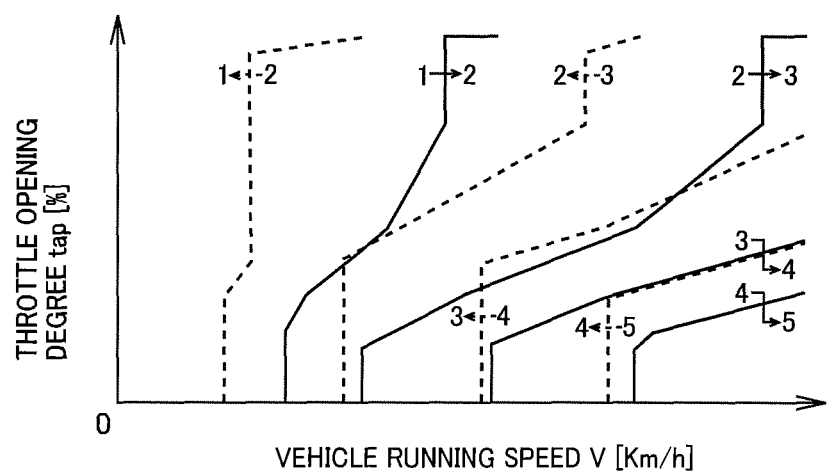
FIG. 5 is a diagram showing a normal-mode shifting map containing normal-mode shifting lines (shift-up lines and shift-down lines) that are used for the gear shifting in the automatic transmission.

The transmission shifting control portion 54 executes a shifting control of the automatic transmission 16. For example, the transmission shifting control portion 54 determines whether gear shifting is to be executed in the automatic transmission 16, with reference to a selected one of a plurality of predetermined relationships in the form of a plurality of shifting maps, and applies the hydraulic control command signals Sp to the hydraulic control unit 26, so as to switch the operation state of at least one of the coupling devices CB, for thereby automatically shifting up or down the automatic transmission 16. FIG. 5 shows a normal-mode shifting map that is one of the shifting maps, by way of example, which contains shifting lines (shift-up lines and shift-down lines) in a two-dimensional coordinate system in which two parameters are taken along respective two axes, wherein one of the two parameters is a vehicle-running-speed-related value such as the AT output speed No and the vehicle running speed V while the other parameter is the required drive force such as the acceleration operation amount θacc, the required drive torque Tdem and the throttle opening degree tap. The shifting lines are formulated to determine the gear position to which the automatic transmission 16 should be shifted. The shifting lines consist of shift-up lines (indicated by solid lines in FIG. 5) based on which the determination of the gear position is made when a shift-up action is to be executed in the transmission 16 and also shift-down lines (indicated by broken lines in FIG. 5) based on which the determination of the gear position is made when a shift-down action is to be executed in the transmission 16. Each of the shift-up lines and shift-down lines is located between corresponding adjacent two of the plurality of gear positions. Each of the shifting lines is provided for determining whether an actual value of the vehicle-running-speed-related value (i.e., vehicle running speed V in the example shown in FIG. 5) has crossed the shifting line along a line that represents a certain value of the required drive force (i.e., throttle opening degree tap in the example shown in FIG. 5), or whether an actual value of the required drive force has crossed the shifting line along a line that represents a certain value of the vehicle-running-speed-related value. That is, each shifting line is provided for determining whether the actual value of the vehicle-running-speed-related value or the actual value of the required drive force has crossed a corresponding one of shifting values or points which lies on the shifting line and which indicates that gear shifting is to be executed. Thus, each shifting line is a predetermined line that corresponds to a succession of such shifting points. The plurality of maps, which represent the shifting lines, are stored in a rewritable non-volatile memory 70 as a storage device that is one of in-vehicle devices included in the electronic control device 50.

Figure 6A:
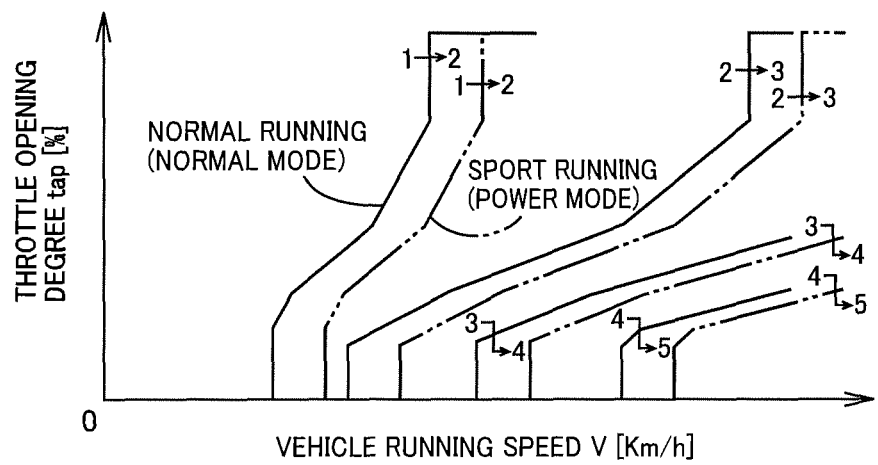
FIG. 6A is a diagram showing normal-mode shift-up lines and sport-mode shift-up lines that are used for shift-up actions executed in the automatic transmission.
Figure 6B:
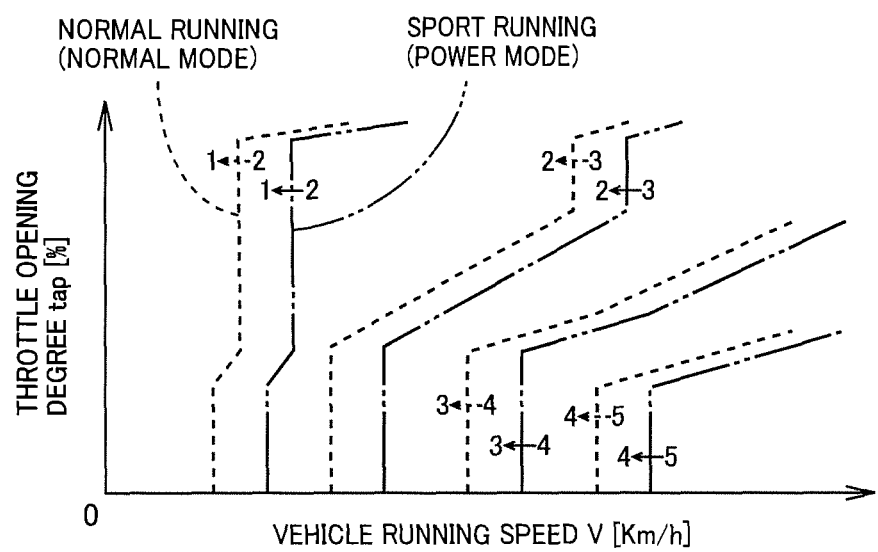
FIG. 6B is a diagram showing normal-mode shift-down lines and sport-mode shift-down lines that are used for shift-down actions executed in the automatic transmission.
Figure 7A:
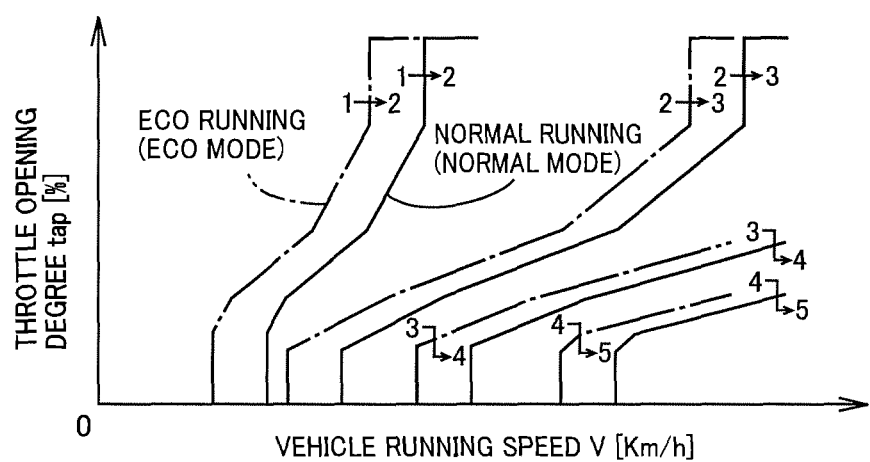
FIG. 7A is a diagram showing normal-mode shift-up lines and economy-mode shift-up lines that are used for shift-up actions executed in the automatic transmission.
Figure 7B:
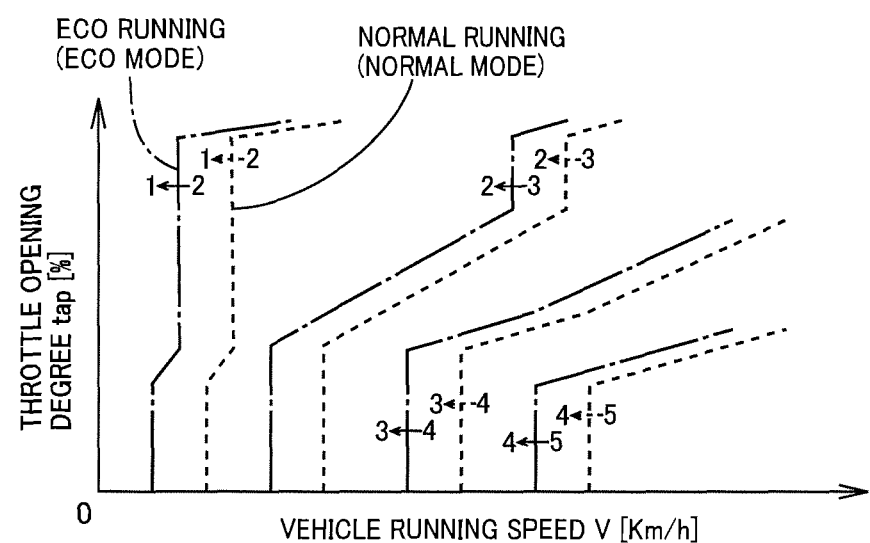
FIG. 7B is a diagram showing normal-mode shift-down lines and economy-mode shift-down lines that are used for shift-down actions executed in the automatic transmission.

The shifting lines include various kinds of shifting lines such as normal-mode shifting lines (such as those shown in FIGS. 5, 6A, 6B, 7A and 7B), sport-mode shifting lines (such as those shown in FIGS. 6A and 6B) and economy-mode shifting lines (such as those shown in FIGS. 7A and 7B). The normal-mode shifting lines are used for the determination of the gear position in the automatic transmission 16, for example, during the normal mode, and are formulated to enable the vehicle 10 to run in a condition sufficiently exhibiting the drive force performance with the satisfactory fuel efficiency performance. The sport-mode shifting lines are used for the determination of the gear position in the automatic transmission 16, for example, during the sport mode, and are formulated such that a lower gear position (i.e., a lower speed position) is more likely to be selected as compared with the normal-mode shifting lines, as shown in FIGS. 6A and 6B, for thereby giving more importance to the drive force performance than to the fuel efficiency performance. The economy-mode shifting lines are used for the determination of the gear position in the automatic transmission 16, for example, during the economy mode, and are formulated such that a higher gear position (i.e., a higher speed position) is more likely to be selected as compared with the normal-mode shifting lines, as shown in FIGS. 7A and 7B, for thereby giving more importance to the fuel efficiency performance than to the drive force performance. Thus, the shifting lines stored in the non-volatile memory 70 are shifting lines that are formulated to be adapted to the vehicle 10.

The electronic control device 50 establishes the sport mode as the drive mode of the vehicle 10, for example, when the sport mode is selected by the drive-mode selector switch 46, or when a state of change of the acceleration operation amount θacc is a predetermined change state S corresponding to an acceleration operation that indicates need to place the drive mode into the sport mode. The electronic control device 50 establishes the economy mode as the drive mode of the vehicle 10, for example, when the economy mode is selected by the drive-mode selector switch 46, or when the state of change of the acceleration operation amount θacc is a predetermined change state E corresponding to an acceleration operation that indicates need to place the drive mode into the economy mode. The electronic control device 50 establishes the normal mode as the drive mode of the vehicle 10, for example, when establishing neither the sport mode nor the economy mode as the drive mode of the vehicle 10.

It might be possible to switch the shifting lines (to be used for the gear shifting in the automatic transmission 16), depending on difference among various types of roads such as road of an urban region, road of a suburb region, paved road of a mountain region, highway road (motorway) and unpaved road (such as farm road). In the present embodiment, the center 100 stores therein the shifting maps which are directed to the respective areas corresponding to the respective types of roads. The electronic control device 50 executes the gear shifting in the automatic transmission 16, by using information which is related to the shifting lines contained in each of the shifting maps and which is received from the center 100. However, there is a possibility that the gear shifting with use of the shifting lines stored in the center 100 does not correspond to gear shifting in conformity with an intention of the vehicle operator. In the present embodiment, it is suggested to execute the gear shifting in the automatic transmission 16, in accordance with at least one selected shifting line that is appropriately selected from among the shifting lines stored in the non-volatile memory 70 and the shifting lines stored in the center 100, such that the gear shifting is made in conformity with the type of road in which the vehicle 10 currently runs and also the intention of an operator of the vehicle 10.

In the present embodiment, the intention of the vehicle operator is represented by information related to an acceleration representative value representing an acceleration of the vehicle required by the vehicle operator. The information related to the acceleration representative value is information that indicates, for example, whether a change of the acceleration representative value is large or small, or whether a frequency of an acceleration required by the vehicle operator is large or small. The acceleration representative value corresponds to, for example, the required drive force, and the throttle opening degree tap is used as the required drive force in the following description.

Further, in the present embodiment, the road in which the vehicle 10 is currently running is represented by information related to the current location of the vehicle 10. The information related to the current location is information that indicates, for example, whether the current location is in at least one predetermined area in which a volume of information (i.e., control information Ic) related to the other vehicles 110 is large or is in at least one predetermined area in which the volume of information related to the other vehicles 110 is small, and/or whether the current location is in at least one predetermined area in which more importance is given to the drive force performance than to the fuel efficiency performance or is in at least one predetermined area in which more importance is given to the fuel efficiency performance than to the drive force performance. Each area corresponds to one of various types of roads. The areas each corresponding to a road of an urban region will be referred to as "urban region". The areas each corresponding to a road of a suburb region will be referred to as "suburb region". The areas each corresponding to a paved road of a mountain region will be referred to as "mountain region". The areas each corresponding to a highway road (motorway) will be referred to as "highway region". The areas each corresponding to an unpaved road (such as farm road) will be referred to as "rural region". It is noted that the term "area" may be interpreted to mean a zone having a given range, wherein it can be regarded that the type of road is substantially the same in any part of the zone (area), and wherein the given range is a range that varies depending on the type of road. Where the urban region is compared with the suburb region or the mountain region, the at least one predetermined area in which the volume of information related to the other vehicles 110 is large correspond to the urban region in which a traffic volume is large, and the at least one predetermined area in which the volume of information related to the other vehicles 110 is small correspond to the suburb region or the mountain region. Where the mountain region is compared with the urban region or the suburb region, the at least one predetermined area in which more importance is given to the drive force performance correspond to the mountain region, and the at least one predetermined area in which more importance is given to the fuel efficiency performance correspond to the urban region or the suburb region.

In the vehicle 10, the shifting lines stored in the non-volatile memory 70 are recognized as first shifting lines, and the shifting lines stored in the center 100 are recognized as second shifting lines. In the present embodiment, the first shifting lines will be referred to as "vehicle shifting lines", and the second shifting lines will be referred to as "center shifting lines". Since the shifting lines stored in the center 100 correspond to information received from the center 100 and related to the other vehicle 110 (hereinafter referred to as "other-vehicle-related information"), the second shifting lines are shifting lines in which the other-vehicle-related information is reflected. The sport-mode shifting lines stored in the non-volatile memory 70 will be referred to as "sport-mode vehicle shifting lines". The other shifting lines will be referred to in the similar manners, too.

The electronic control device 50 further includes an information processing means or portion in the form of an information processing portion 56, a shifting-line changing means or portion in the form of a shifting-line changing portion 58 and a vehicle-state determining means or portion in the form of a vehicle-state determining portion 60, for performing various controls for executing the gear shifting in the automatic transmission 16, in accordance with an appropriately selected one of the above-described shifting maps, namely, in accordance with at least one selected shifting line, which is selected from among the various kinds of shifting lines.

Figure 2:
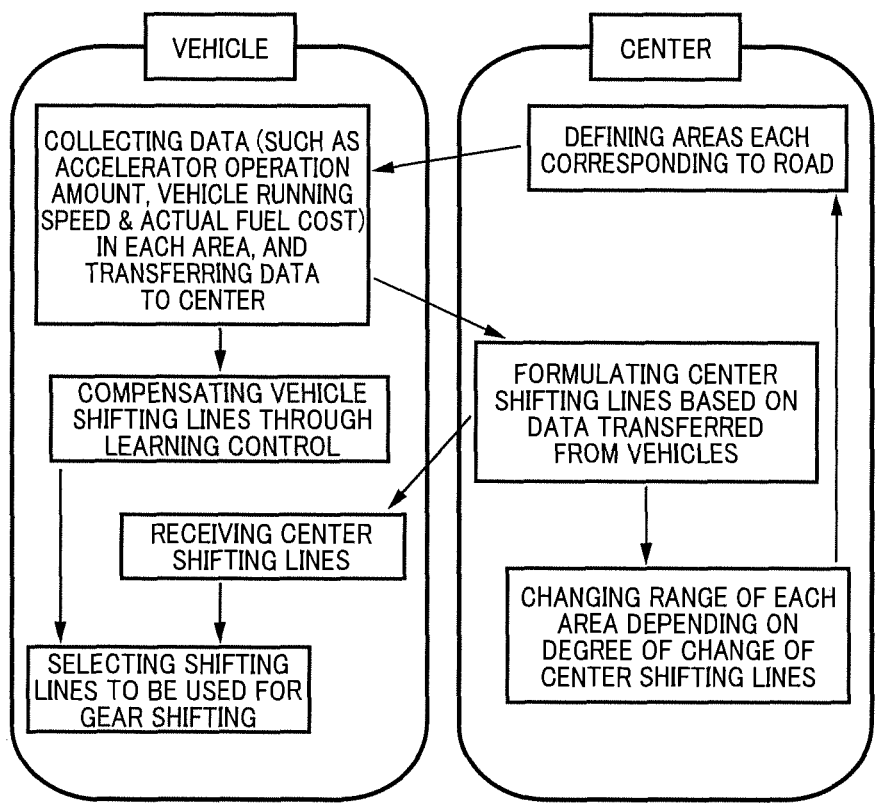
FIG. 2 is a view showing a concept of a control for selecting an appropriate one of the shifting maps.

FIG. 2 is a view showing a concept of the control for selecting an appropriate one of the shifting maps, namely, appropriately selecting at least one shifting line. As shown in FIG. 2, the center 100 determines or defines the areas each corresponding to one of the types of roads. Initially, each area is defined to have a predetermined range that varies depending on which kind of region the area belongs to. Each area belonging to the urban region has a range narrower than that of each area belonging to the suburb region. Each area belonging to the suburb region has a range narrower than that of each area belonging to the mountain region. Each area belonging to the mountain region has a range substantially the same as that of each area belonging to the highway region. Each area belonging to the rural region has a range which is wider than that of each area belonging to the urban region and which is narrower than that of each area belonging to the suburb region. The range of each area is determined such that the larger the traffic volume is, the smaller the determined range is, and/or the more the intention or preference in operation is variable among vehicle operators, the smaller the determined range is.

In the vehicle 10, the information processing portion 56 receives information related to each of the areas defined or determined by the center 100 via the transceiver 28, and then collects data during running in each of the areas, wherein the data contains, for example, the acceleration operation amount θacc, running speed V and actual fuel cost. The information processing portion 56 generates a control information Ic for each of the areas, such that the collected data is associated with a location information Svp of the vehicle Svp. The information processing portion 56 transfers the control information Ic in a certain length of time, to the center 100 via the transceiver 28.

The control information Ic is transferred to the center 100 from each of the other vehicles 110 as well as from the vehicle 10. The center 100 formulates center shifting lines (i.e., center shifting map) for each of the areas, based on the control information Ic for each of the areas. The center 100 uses an average value of the acceleration operation amount θacc, an average value of the running speed V and an average value of the actual fuel cost, which are represented in the control information Ic in the most recent period having a given length of time, and formulates normal-mode center shifting lines which enable the vehicle 10 to run in a condition sufficiently exhibiting the drive force performance with the satisfactory fuel efficiency performance, in a certain manner, by taking account of a running pattern defined by the average values of the acceleration operation amount θacc and the running speed V and also the average value of the actual fuel cost. The center 100 formulates sport-mode center shifting lines in a certain manner such that a lower gear position (i.e., a lower speed position) is more likely to be selected as compared with the normal-mode center shifting lines. The center 100 formulates economy-mode center shifting lines in a certain manner such that a higher gear position (i.e., a higher speed position) is more likely to be selected as compared with the normal-mode center shifting lines. When newly formulating or setting the center shifting lines for one of the areas, the center 100 updates the center shifting lines such that the updated center shifting lines reflect the new setting. Thus, each of the center shifting lines is a shifting line in which the other-vehicle-related information (i.e., control information Ic for each area) is reflected. When a degree of change of the center shifting lines upon update of the center shifting lines exceeds a threshold degree or when the degree of the change exceeds a threshold degree a number of times exceeding a threshold number, the center 100 narrows the area corresponding to the changed center shifting lines. That is, the center 100 reduces the range of the area in question. It is noted that, when the degree of change is successively small than a second threshold degree that is smaller than the above-described threshold degree, the center 100 may increase the range of the area corresponding to the small-changed center shifting lines.

The information processing portion 56 receives the center shifting lines for the area corresponding to the current location indicated by the location information Svp, for example, as needed, from the center 100 via the transceiver 28.

The shifting-line changing portion 58 selects either the vehicle shifting lines or the center shifting lines, as the shifting lines used for executing the gear shifting in the automatic transmission 16. In this instance, the selection is made based on the acceleration representative value and the information related to the current location of the vehicle 10. Thus, the transmission shifting control portion 54 executes the gear shifting in the automatic transmission 16 by using the shifting lines that are appropriately selected based on the acceleration representative value and the information related to the current location of the vehicle 10. The shifting-line changing portion 58 may compensate or shift the vehicle shifting lines through a learning control, as shown in FIG. 2. For example, when the state of change of the acceleration operation amount θacc repeatedly becomes coincident to the above-described predetermined change state S, the shifting-line changing portion 58 compensates or shifts the current vehicle shifting lines such that a lower gear position (i.e., a lower speed position) becomes more likely to be selected.

When the state of change of the acceleration operation amount θacc repeatedly becomes coincident to the above-described predetermined change state E, the shifting-line changing portion 58 compensates or shifts the current vehicle shifting lines such that a higher gear position (i.e., a higher speed position) becomes more likely to be selected. The vehicle shifting lines, which have been compensated or shifted through the learning control, becomes more adapted to the vehicle 10.

The control operation for selection of the shifting lines will be described in detail, by way of example where the vehicle 10 is running with the economy-mode center shifting lines being selected. Among the various kinds of center shifting lines, the economy-mode center shifting lines are fuel-efficiency-performance-directed second shifting lines that are used when higher importance is given to the fuel efficiency performance than to the drive force performance.

The vehicle-state determining portion 60 determines whether a change of the acceleration representative value is large. Specifically, the vehicle-state determining portion 60 determines whether an amount Δtap (hereinafter referred to as "throttle change amount Δtap") of change of the throttle opening degree tap has exceeded a first threshold value. When having determined that the throttle change amount Δtap had exceeded the first threshold value, the vehicle-state determining portion 60 determines whether the throttle change amount Δtap has exceeded a second threshold value smaller than the first threshold value at least a given number of times within the most recent period having a given length of time. Each of the above-described first threshold value, second threshold value, given number of times and given length of time is a predetermined threshold that is predetermined to make a determination as to whether the change of the acceleration representative value is large or not. The vehicle-state determining portion 60 determines that the change of the acceleration representative value is large, when determining that the throttle change amount Δtap has exceeded the first threshold value and that the throttle change amount Δtap has exceeded the second threshold value at least the given number of times within the most recent period having the given length of time. The vehicle-state determining portion 60 determines that the change of the acceleration representative value is small, when determining that the throttle change amount Δtap has not exceeded the first threshold value or when determining that the throttle change amount Δtap has not exceeded the second threshold value at least the given number of times within the most recent period having the given length of time. It is noted that the throttle change amount Δtap represents the change amount within a certain length of time corresponding to a control cycle, and corresponds to a rate of change of the throttle opening degree tap.

The vehicle-state determining portion 60 determines a state of the vehicle 10, so as to obtain the information related to the current location of the vehicle 10. Specifically, the vehicle-state determining portion 60 determines which one of the plurality of areas the vehicle 10 is currently located in. For example, the vehicle-state determining portion 60 determines whether the current location of the vehicle 10 is in at least one predetermined area (e.g., the urban region) in which the volume of the control information Ic of the other vehicles 110 is large. In other words, the vehicle-state determining portion 60 determines whether the current location of the vehicle 10 is in at least one predetermined area (e.g., the suburb region or mountain region) in which the volume of the control information Ic of the other vehicles 110 is small.

During running of the vehicle 10 with the economy-mode center shifting lines being selected, when the vehicle-state determining portion 60 determines that the change of the acceleration representative value is large and that the current location of the vehicle 10 is in the at least one predetermined area in which the volume of the control information Ic of the other vehicles 110 is large, the shifting-line changing portion 58 switches the selected shifting lines (that are used for the gear shifting in the automatic transmission 16), from the economy-mode center shifting lines to the normal-mode center shifting lines, which correspond to normal-running-directed second shifting lines formulated to enable the vehicle 10 to run in a condition exhibiting the drive force performance with the satisfactory fuel efficiency performance, and which correspond also to drive-force-performance-directed second shifting lines map used when more importance is given to the drive force performance than when economy-mode center shifting lines are used.

During running of the vehicle 10 with the economy-mode center shifting lines being selected, when the vehicle-state determining portion 60 determines that the change of the acceleration representative value is large and that the current location of the vehicle 10 is in the at least one predetermined area in which the volume of the control information Ic of the other vehicles 110 is small, the shifting-line changing portion 58 switches the selected shifting lines (that are used for the gear shifting in the automatic transmission 16), from the economy-mode center shifting lines to one of the various kinds of vehicle shifting lines, which is selected, preferably, depending on the drive mode currently selected in the vehicle 10. In this instance, the shifting lines may be switched to normal-mode vehicle shifting lines, which correspond to normal-running-directed first shifting lines formulated to enable the vehicle 10 to run in a condition exhibiting the drive force performance with the satisfactory fuel efficiency performance.

During running of the vehicle 10 with the economy-mode center shifting lines being selected, when the vehicle-state determining portion 60 determines that the change of the acceleration representative value is small, the shifting-line changing portion 58 keeps or continues the economy-mode center shifting lines, without switching the selected shifting lines to any other kinds of shifting lines.

Figure 3:
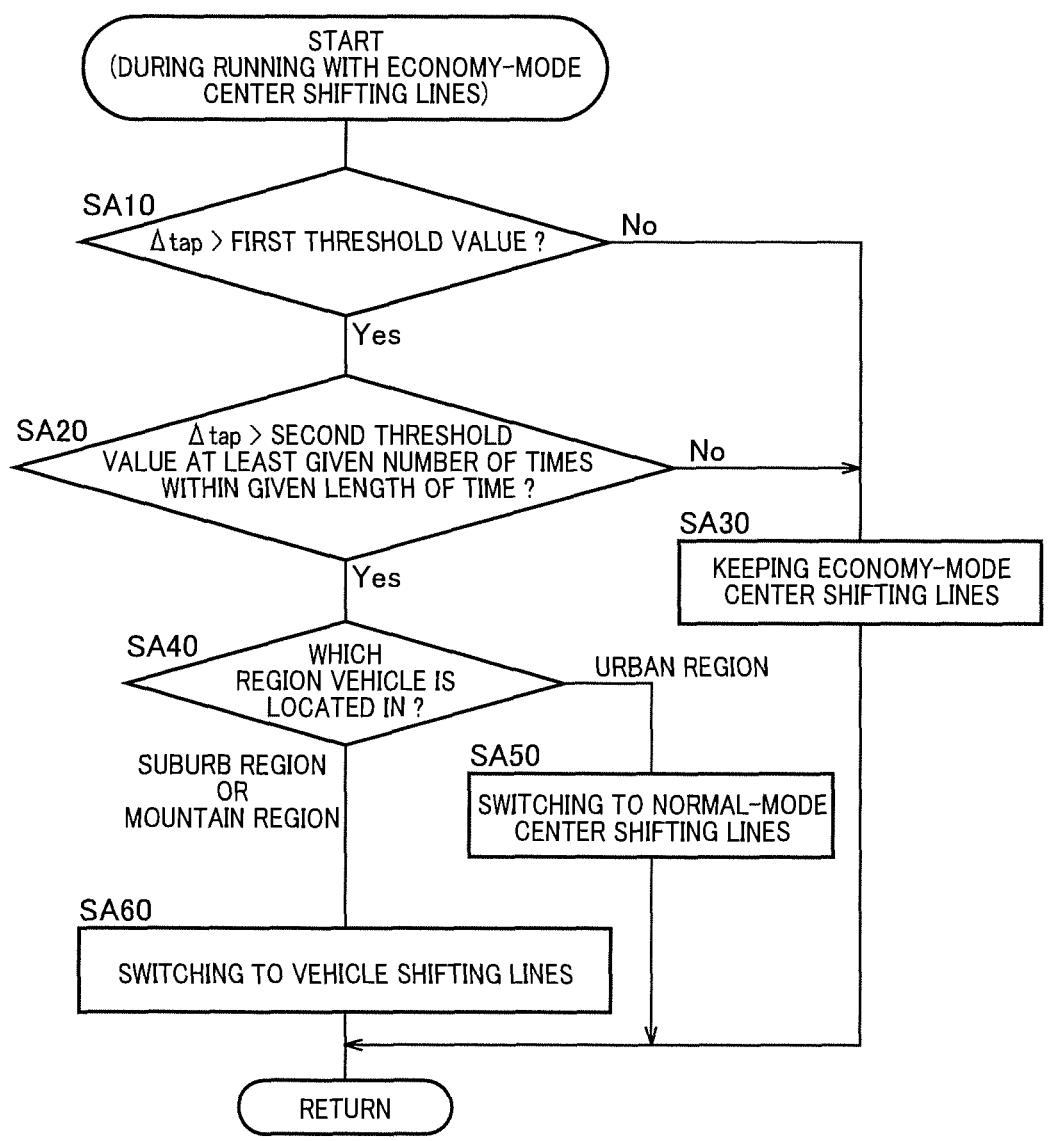
FIG. 3 is a flow chart showing a part of control routine that is executed by an electronic control device as the control apparatus, so as to execute gear shifting in an automatic transmission, in conformity with the type of road and the intention of an operator of the vehicle.

FIG. 3 is a flow chart showing a part of control routine that is executed by the electronic control device 50, so as to execute gear shifting in the automatic transmission 16, in conformity with the type of road and the intention of the vehicle operator. This control routine is repeatedly executed, for example, during running of the vehicle 10 with the economy-mode center shifting lines being selected.

The control routine of FIG. 3 is initiated with step SA10 (hereinafter simply referred to as "SA10" as well as the other steps) corresponding to the function of the vehicle-state determining portion 60. The SA10 is implemented to determine whether the throttle change amount Δtap has exceeded the first threshold value. If an affirmative determination is made at the SA10, SA20 corresponding to the function of the vehicle-state determining portion 60 is implemented to determine whether the throttle change amount Δtap has exceeded the second threshold value (<the first threshold value) at least the given number of times within the most recent period having the given length of time. If a negative determination is made at the SA10 or at the SA20, the control flow goes to SA30 corresponding to the function of the shifting-line changing portion 58, to keep or continue the economy-mode center shifting lines. If an affirmative determination is made at SA20, SA40 corresponding to the vehicle-state determining portion 60 is implemented to obtain the information related to the current location of the vehicle 10 (i.e., own-vehicle area information) and determine which one of the plurality of areas the vehicle 10 is currently located in, namely, which one the regions the vehicle 10 is currently located in. When it is determined at SA40 that the vehicle 10 is currently located in one of the areas which is located in the urban region, the control flow goes to SA50 corresponding to the shifting-line changing portion 58, to switch the selected shifting lines (that are used for the gear shifting in the automatic transmission 16) from the economy-mode center shifting lines to the normal-mode center shifting lines. When it is determined at SA40 that the vehicle 10 is currently located in one of the areas which is located in the suburb region or mountain region, the control flow goes to SA60 corresponding to the shifting-line changing portion 58, to switch the selected shifting lines from the economy-mode center shifting lines to the vehicle shifting lines that are shifting lines for a stand-alone vehicle.

In the present embodiment, the gear shifting is executed in the automatic transmission 16, in accordance with at least one selected shifting line, which is selected appropriately depending on (i) the acceleration representative information related to the acceleration representative value and reflecting an intention of the vehicle operator and a degree of satisfaction of the vehicle operator and (ii) the location information related to the current location of the vehicle 10 and reflecting a volume of the other-vehicle-related information and a driving operation tendency, which vary area to area. The at least one selected shifting line is selected appropriately from among at least one first shifting line in the form of the vehicle shifting lines in which the other-vehicle-related information is not reflected but which is adapted to the vehicle 10 (for example, in which the required acceleration in the vehicle 10 is reflected) and the at least one second shifting line in the form of the center shifting lines in which the unique difference in each area is reflected by reflection of the other-vehicle-related information. Thus, the gear shifting in the automatic transmission 16 can be executed in conformity with the type of road and the intention of the vehicle operator.

In the present embodiment, during running of the vehicle 10 with at least one fuel-efficiency-performance-directed second shifting line in the form of the economy-mode center shifting lines being selected as the at least one selected shifting line, the at least one selected shifting line is switched to at least one drive-force-performance-directed second shifting line in the form of the normal-mode center shifting lines, when the change of the acceleration representative value is large and the current location of the vehicle is in at least one predetermined area in which the volume of the other-vehicle-related information is large, so that it is possible to execute the gear shifting in a manner enabling the acceleration required by the vehicle operator and suitable for the area in which the vehicle 10 currently runs. On the other hand, during running of the vehicle with the at least one fuel-efficiency-performance-directed second shifting line in the form of the economy-mode center shifting lines being selected as the at least one selected shifting line, the at least one selected shifting line is switched to the at least one first shifting line in the form of the vehicle shifting lines, when the change of the acceleration representative value is large and the current location of the vehicle 10 is in at least one predetermined area in which the volume of the other-vehicle-related information is small. Thus, it is possible to execute the gear shifting in a manner enabling the acceleration required by the vehicle operator, which varies depending on the area in which the vehicle 10 runs.

In the present embodiment, during running of the vehicle 10 with the at least one fuel-efficiency-performance-directed second shifting line in the form of the economy-mode center shifting lines being selected as the at least one selected shifting line, the economy-mode center shifting lines are kept as the at least one selected shifting line, when the change of the acceleration representative value is small. Thus, it is possible to execute the gear shifting in a manner suitable for the area in which the vehicle 10 currently runs and providing the fuel efficiency performance.

In the present embodiment, the change of the acceleration representative value is determined to be large, when the throttle change amount Δtap has exceeded the first threshold value and the throttle change amount Δtap has exceeded the second threshold value smaller than the first threshold value at least the given number of times within the most recent period having the given length of time. Thus, it is possible to appropriately determine the intention of the vehicle operator and the degree of satisfaction of the vehicle operator.

There will be described other embodiments of this invention. The same reference signs as used in the above-described first embodiment will be used in the following embodiments, to identify the functionally corresponding elements.

Second Embodiment

In the present second embodiment, there will be described the control operation for selection of the shifting lines, by way of example where the vehicle 10 is running with the sport-mode vehicle shifting lines being selected. Among the various kinds of vehicle shifting lines, the sport-mode vehicle shifting lines are drive-force-performance-directed first shifting lines that are used when higher importance is given to the drive force performance than to the fuel efficiency performance.

The vehicle-state determining portion 60 determines whether a frequency of the acceleration required by the operator is large. Specifically, the vehicle-state determining portion 60 determines whether the vehicle 10 has been accelerated with the throttle opening degree tap as the acceleration representative value being larger than a given threshold value, at least a given number of times within the most recent period having a given length of time, namely, whether the number of times of acceleration of the vehicle 10 with the throttle opening degree tap being larger than the given threshold is at least the given number of times within the most recent period having the given length of time. Each of the above-described given threshold value, given length of time and given number of times is a predetermined threshold that is predetermined to make a determination as to whether the frequency of the acceleration required by the operator is large or not. The vehicle-state determining portion 60 determines that the frequency of the acceleration required by the operator is large, when determining that the vehicle 10 has been accelerated with the throttle opening degree tap being larger than the given threshold value, at least the given number of times within the most recent period having the given length of time, namely, when determining that the number of the acceleration with the throttle opening degree tap being larger than the given threshold value is at least the given number of times within the most recent period having the given length of time. The vehicle-state determining portion 60 determines that the frequency of the acceleration required by the operator is small, when determining that the vehicle 10 has not been accelerated with the throttle opening degree tap being larger than the given threshold value, at least the given number of times within the most recent period having the given length of time, namely, when determining that the number of the acceleration with the throttle opening degree tap being larger than the given threshold value is smaller than the given number of times within the most recent period having the given length of time.

The vehicle-state determining portion 60 determines which one of the plurality of areas the vehicle 10 is currently located in, by determining whether the vehicle 10 is currently located in at least one predetermined area (such as that belonging to the mountain region) in which more importance is given to the drive force performance than to the fuel efficiency performance.

During running of the vehicle 10 with the sport-mode vehicle shifting lines being selected, when the vehicle-state determining portion 60 determines that the frequency of the acceleration required by the operator is small and that the vehicle 10 is currently located in at least one predetermined area in which the volume of the control information Ic of the other vehicles 110 is large, the shifting-line changing portion 58 switches the selected shifting lines (that are used for the gear shifting in the automatic transmission 16), from the sport-mode vehicle shifting lines to the economy-mode center shifting lines.

During running of the vehicle 10 with the sport-mode vehicle shifting lines being selected, when the vehicle-state determining portion 60 determines that the frequency of the acceleration required by the operator is small and that the vehicle 10 is currently located in at least one predetermined area in which the volume of the control information Ic of the other vehicles 110 is small, the shifting-line changing portion 58 switches the selected shifting lines, from the sport-mode vehicle shifting lines to the normal-mode center shifting lines.

During running of the vehicle 10 with the sport-mode vehicle shifting lines being selected, when the vehicle-state determining portion 60 determines that the frequency of the acceleration required by the operator is large or determines that the vehicle 10 is currently located in at least one predetermined area in which more importance is given to the drive force performance than to the fuel efficiency performance, the shifting-line changing portion 58 keeps or continues the sport-mode vehicle shifting lines, without switching the selected shifting lines to any other kinds of shifting lines.

Figure 4:
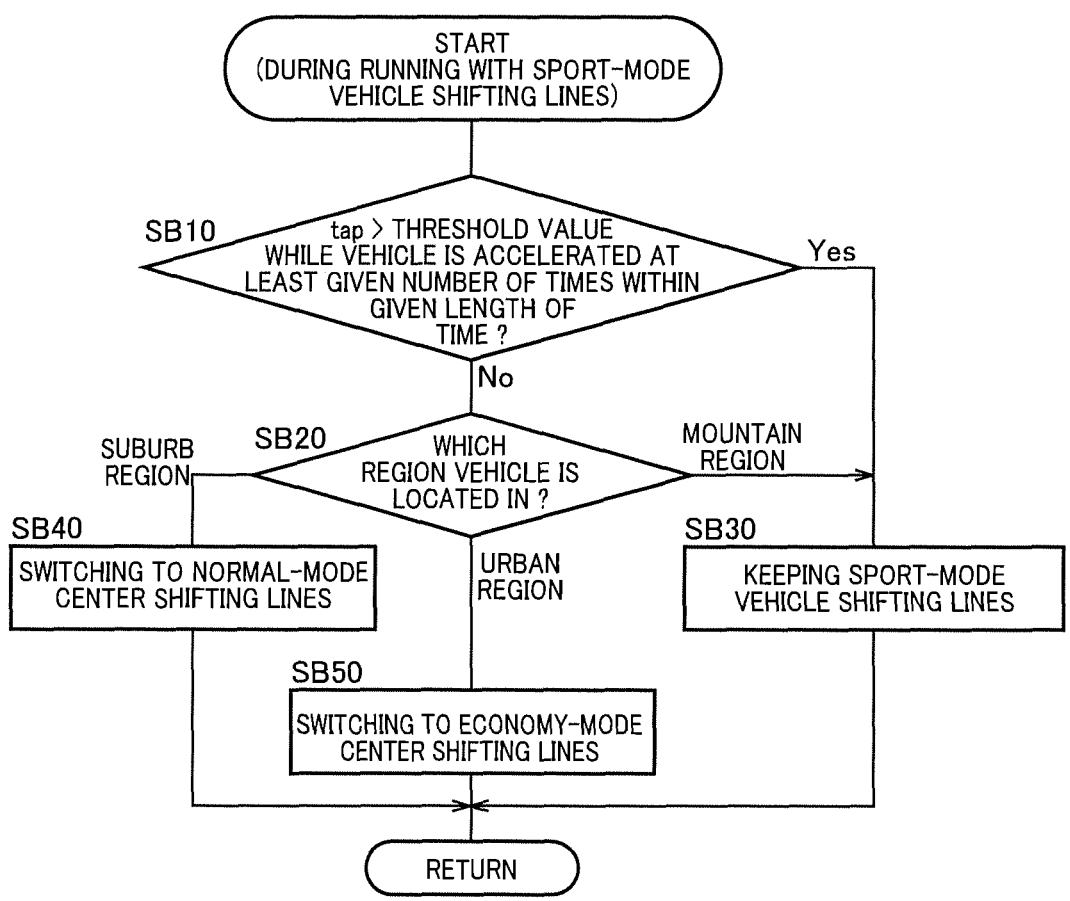
FIG. 4 is a flow chart showing a part of control routine that is executed by the electronic control device, so as to execute gear shifting in the automatic transmission, in conformity with the type of road and the intention of the vehicle operator, wherein this control routine is different from the control routine shown in FIG. 3.

FIG. 4 is a flow chart showing a part of control routine that is executed by the electronic control device 50, so as to execute gear shifting in the automatic transmission 16, in conformity with the type of road and the intention of the vehicle operator. This control routine is repeatedly executed, for example, during running of the vehicle 10 with the sport-mode vehicle shifting lines being selected. This control routine is a control routine that is other than that shown by the flow chart of FIG. 3.

The control routine of FIG. 4 is initiated with step SB10 corresponding to the function of the vehicle-state determining portion 60. The SB10 is implemented to determine whether the number of the acceleration with the throttle opening degree tap being larger than the given threshold value is at least the given number of times within the most recent period having the given length of time. If a negative determination is made at the SB10, SB20 corresponding to the function of the vehicle-state determining portion 60 is implemented to obtain the information (own-vehicle area information) related to the current location of the vehicle 10 and determine which one of the mountain region, suburb region and urban region the vehicle 10 is currently located in. If an affirmative determination is made at SB10, or if it is determined at SB20 that the vehicle 10 is currently located in the mountain region, the control flow goes to SB30 corresponding to the function of the shifting-line changing portion 58, to keep or continue the sport-mode vehicle shifting lines, without switching the selected shifting lines to any other kinds of shifting lines. If it is determined at SB20 that the vehicle 10 is currently located in the suburb region, the control flow goes to SB40 corresponding to the function of the shifting-line changing portion 58, to switch the selected shifting lines (that are used for the gear shifting in the automatic transmission 16) from the sport-mode vehicle shifting lines to the normal-mode center shifting lines. If it is determined at SB20 that the vehicle 10 is currently located in the urban region, the control flow goes to SB50 corresponding to the function of the shifting-line changing portion 58, to switch the selected shifting lines from the sport-mode vehicle shifting lines to the economy-mode center shifting lines.

In the present second embodiment, during running of the vehicle 10 with at least one drive-force-performance-directed first shifting line in the form of the sport-mode vehicle shifting lines being selected as the at least one selected shifting line, the at least one selected shifting line is switched to the at least one fuel-efficiency-performance-directed second shifting line in the form of the economy-mode center shifting lines, when the frequency of the acceleration required by the operator is small and the current location of the vehicle 10 is in the at least one predetermined area in which the volume of the other-vehicle-related information is large, so that it is possible to execute the gear shifting in a manner suitable for the area in which the vehicle 10 currently runs and also providing the fuel efficiency performance. On the other hand, during running of the vehicle with the sport-mode vehicle shifting lines being selected as the at least one selected shifting line, the at least one selected shifting line is switched to the at least one drive-force-performance-directed second shifting line in the form of the normal-mode center shifting lines, when the frequency of the acceleration required by the operator is small and the current location of the vehicle is in the at least one predetermined area in which the volume of the other-vehicle-related information is small, so that it is possible to execute the gear shifting in a manner enabling the acceleration required by the vehicle operator and suitable for the area in which the vehicle 10 currently runs.

In the present second embodiment, during running of the vehicle 10 with the at least one drive-force-performance-directed first shifting line in the form of the sport-mode vehicle shifting lines being selected as the at least one selected shifting line, the sport-mode vehicle shifting lines are kept as the at least one selected shifting line, when the frequency of the acceleration required by the operator is large or when the current location of the vehicle 10 is in the at least one predetermined area in which more importance is given to the drive force performance than to the fuel efficiency performance, so that it is possible to execute the gear shifting in a manner enabling the acceleration that is required by the vehicle operator in conformity with the area in which the vehicle 10 currently runs.

In the present second embodiment, the frequency of the acceleration required by the operator is determined to be large, when the vehicle 10 has been accelerated with the throttle opening degree tap being larger than the given threshold value, at least the given number of times within the most recent period having the given length of time. Thus, it is possible to appropriately determine the intention of the vehicle operator and the degree of satisfaction of the vehicle operator.

While the preferred embodiments of this invention have been described in detail by reference to the drawings, it is to be understood that the invention may be otherwise embodied.

In the above-described embodiments, the normal-mode center shifting lines are examples of the drive-force-performance-directed second shifting lines. However, the drive-force-performance-directed second shifting lines may be any other kinds of the center shifting lines that are used when the drive force performance is given more importance than when the economy-mode center shifting lines are used. For example, the drive-force-performance-directed second shifting lines may be the sport-mode center shifting lines. Each of the adjectives "fuel-efficiency-performance-directed" and "drive-force-performance-directed" as modifiers of the term "shifting lines" is interpreted to represent which one of the fuel efficiency performance and the drive force performance is given more importance in the corresponding shifting lines. Thus, the fuel-efficiency-performance-directed shifting lines do not necessarily have to be shifting lines that are to be selected during the economy mode, and the drive-force-performance-directed shifting lines do not necessarily have to be shifting lines that are to be selected during the sport mode.

In the above-described embodiments, the center 100 first formulates the normal-mode center shifting lines, and then formulates the sport-mode center shifting lines and economy-mode center shifting lines based on the normal-mode center shifting lines. However, the center 100 may first formulate the economy-mode center shifting lines, so that the economy-mode center shifting lines are formulated with constants that are suitable for a maximum number of the vehicles, namely, so that the formulated economy-mode center shifting lines are suitable for a maximum number of the vehicles. Further, the center 100 does not have to store various kinds of center shifting lines, and may formulate and store only basic shifting lines. In this case, for example, the vehicle 10 may receive the basic shifting lines as the center shifting lines from the center 100 and then formulate various kinds of center shifting lines based on the basic shifting lines. Further, in this case, if the vehicle 10 is a vehicle in which the actual fuel cost is low, the vehicle 10 may receive the basic shifting lines as the economy-mode center shifting lines from the center 100. If the vehicle 10 is a vehicle in which the actual fuel cost is high, the vehicle 10 may receive the basic shifting lines as the sport-mode center shifting lines from the center 100. Thus, the center 100 does not necessarily have to store kinds of center shifting lines, as long as the center 100 stores at least one kind of center shifting lines. Thus, anything done by the vehicle 10 and anything done by the center 100 may be done by either the vehicle 10 or the center 100, except for a certain thing or things that have to be done by only one of them.

In the above-described embodiments, the shifting lines stored in the center 100 are received and recognized as the second shifting lines. However, for example, the shifting lines do not necessarily have to be stored in the center 100. The center 100 may be configured, in response to request from the vehicle 10, to formulate shifting lines in which the other-vehicle-related information (i.e., information related to the other vehicles 110) is reflected, so that the formulated shifting lines are received by the vehicle 10. Further, the center 100 may collect the other-vehicle-related information, so that the vehicle 10 receives the other-vehicle-related information from the center 100 and then formulates the second shifting lines based on the received other-vehicle-related information. In this case, too, the second shifting lines should be interpreted as shifting lines in which the other-vehicle-related information (that is received from the center 100) is reflected.

In the present invention, the gear shifting in the automatic transmission 16 is executed in accordance with at least one selected shifting line, which is selected appropriately from among the at least one first shifting line and the at least one second shifting line, depending on the acceleration representative information and the location information, wherein the at least one first shifting line may be only one vehicle shifting line and the at least one second shifting line may be only one center shifting line.

In the above-described embodiments, when the at least one selected shifting line is switched from one kind of at least one shifting line to another kind of at least one shifting line, the at least one selected shifting line may be gradually changed step by step from the one kind of at least one shifting line to the other kind of at least one shifting line. Further, the switching of the shifting line may be made after the vehicle 10 has run in the same road a plurality of times. Still further, the switching of the shifting line may be made when the vehicle 10 runs in a road for the first time, for example, in the rural region, namely, in one of the areas each corresponding to an unpaved road (such as farm road).

In the above-described embodiments, the gear shifting in the automatic transmission 16 is executed by using the center shifting lines received from the center 100. However, there could be a case where the vehicle 10 cannot receive the center shifting lines from the center 100, for some reason. In such a case, the vehicle 10 may receive the center shifting lines from one of the other vehicles 110 that store the center shifting lines received from the center 100. In this sense, each of the other vehicles 110 as well as the center 100 is considered to correspond to the external device that is located outside the vehicle 10. Further, the transceiver 68 is considered to be a device configured to communicate the other vehicles 110 as well as to the center 100.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle, 16: Automatic transmission, 50: Electronic control device (Control apparatus), 70: Non-volatile memory (Storage device), 100: Center (External device), 110: Other vehicles (External devices)

What is claimed is:

1. A control apparatus for a vehicle provided with an automatic transmission, said control apparatus being configured to execute gear shifting in the automatic transmission, in accordance with at least one selected shifting line, which is selected from among at least one first shifting line and at least one second shifting line, depending on (i) acceleration representative information based upon an acceleration representative value representing an acceleration of the vehicle required by an operator of the vehicle and (ii) location information based upon a current location of the vehicle, wherein each of said at least one first shifting line is a shifting line stored in a storage device provided in the vehicle, and each of said at least one second shifting line is a shifting line in which other-vehicle-related information is reflected, said other-vehicle-related information being information received from an external device located outside the vehicle, and related to other vehicle that is at least one vehicle other than the vehicle.

2. The control apparatus according to claim 1, wherein the at least one second shifting line includes (a) at least one fuel-efficiency-performance-directed second shifting line that is used when more importance is given to a fuel efficiency performance of the vehicle than to a drive force performance of the vehicle and (b) at least one drive-force-performance-directed second shifting line that is used when more importance is given to the drive force performance than to the fuel efficiency performance, said control apparatus is configured, during running of the vehicle with said at least one fuel-efficiency-performance-directed second shifting line being selected as said at least one selected shifting line, to switch said at least one selected shifting line from said at least one fuel-efficiency-performance-directed second shifting line to said at least one drive-force-performance-directed second shifting line, when a change of said acceleration representative value is larger than a predetermined value and the current location of the vehicle is in at least one predetermined area in which a volume of said other-vehicle-related information is larger than a predetermined number, and said control apparatus is configured, during running of the vehicle with said at least one fuel-efficiency-performance-directed second shifting line being selected as said at least one selected shifting line, to switch said at least one selected shifting line from said at least one fuel-efficiency-performance-directed second shifting line to said at least one first shifting line, when the change of said acceleration representative value is larger than the predetermined value and the current location of the vehicle is in at least one predetermined area in which the volume of said other-vehicle-related information is smaller than the predetermined number.

3. The control apparatus according to claim 2, wherein said control apparatus is configured, during running of the vehicle with said at least one fuel-efficiency-performance-directed second shifting line being selected as said at least one selected shifting line, to keep said at least one fuel-efficiency-performance-directed second shifting line as said at least one selected shifting line, when the change of said acceleration representative value is smaller than the predetermined value.

4. The control apparatus according to claim 2, wherein the change of said acceleration representative value is determined to be larger than the predetermined value, when an amount of the change of said acceleration representative value has exceeded a first threshold value and the amount of the change of said acceleration representative value has exceeded a second threshold value smaller than the first threshold value at least a predetermined number of times within a most recent period having a given length of time.

5. The control apparatus according to claim 1, wherein the at least one first shifting line includes (a) at least one fuel-efficiency-performance-directed first shifting line that is used when more importance is given to a fuel efficiency performance of the vehicle than to a drive force performance of the vehicle and (b) at least one drive-force-performance-directed first shifting line that is used when more importance is given to the drive force performance than to the fuel efficiency performance, the at least one second shifting line includes (c) at least one fuel-efficiency-performance-directed second shifting line that is used when more importance is given to the fuel efficiency performance than to the drive force performance and (d) at least one drive-force-performance-directed second shifting line that is used when more importance is given to the drive force performance than to the fuel efficiency performance, said control apparatus is configured, during running of the vehicle with said at least one drive-force-performance-directed first shifting line being selected as said at least one selected shifting line, to switch said at least one selected shifting line from said at least one drive-force-performance-directed first shifting line to said at least one fuel-efficiency-performance-directed second shifting line, when a frequency of the acceleration required by the operator is smaller than a predetermined value and the current location of the vehicle is in at least one predetermined area in which a volume of said other-vehicle-related information is larger than a predetermined number, and said control apparatus is configured, during running of the vehicle with said at least one drive-force-performance-directed first shifting line being selected as said at least one selected shifting line, to switch said at least one selected shifting line from said at least one drive-force-performance-directed first shifting line to said at least one drive-force-performance-directed second shifting line, when the frequency of the acceleration required by the operator is smaller than a predetermined value and the current location of the vehicle is in at least one predetermined area in which the volume of said other-vehicle-related information is smaller than a predetermined number.

6. The control apparatus according to claim 5, wherein said control apparatus is configured, during running of the vehicle with said at least one drive-force-performance-directed first shifting line being selected as said at least one selected shifting line, to keep said at least one drive-force-performance-directed first shifting line as said at least one selected shifting line, when the frequency of the acceleration required by the operator is larger than the predetermined value or when the current location of the vehicle is in at least one predetermined area in which more importance is given to the drive force performance than to the fuel efficiency performance.

7. The control apparatus according to claim 5, wherein the frequency of the acceleration required by the operator is determined to be larger than the predetermined value, when the vehicle has been accelerated to exceed the predetermined value at least a predetermined number of times within a most recent period having a given length of time.

8. The control apparatus according to claim 1,
said control apparatus generates control information including (a) said location information indicative of an area and (b) said acceleration representative information related to said acceleration representative value representing the acceleration of the vehicle required by the operator of the vehicle in said area, said acceleration representative information being associated with said location information indicative of said area, and
said control apparatus transfers the generated information to the external device, via a transceiver provided in the vehicle.

* * * * *